(12) United States Patent
Sathe et al.

(10) Patent No.: US 11,477,181 B2
(45) Date of Patent: Oct. 18, 2022

(54) NETWORK ENABLED CONTROL OF SECURITY DEVICES

(71) Applicant: Hewlett Packard Enterprise Development LP, Houston, TX (US)

(72) Inventors: Tejas Sathe, Santa Clara, CA (US); Mohd Shahnawaz Siraj, San Jose, CA (US); Manoj Thawani, San Jose, CA (US); Berend Dunsbergen, San Jose, CA (US); Jian Dong, Santa Clara, CA (US); Kannan Konath, Santa Clara, CA (US); Vaibhav Mittal, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 682 days.

(21) Appl. No.: 16/268,526

(22) Filed: Feb. 6, 2019

(65) Prior Publication Data

US 2020/0252380 A1    Aug. 6, 2020

(51) Int. Cl.
*H04L 9/40* (2022.01)
*H04W 12/0431* (2021.01)

(52) U.S. Cl.
CPC .......... *H04L 63/062* (2013.01); *H04L 63/068* (2013.01); *H04L 63/08* (2013.01); *H04W 12/0431* (2021.01)

(58) Field of Classification Search
CPC .. H04W 12/0431; H04W 12/06; H04L 63/08; H04L 63/068; H04L 63/062
USPC .......................................................... 726/7
See application file for complete search history.

(56) References Cited

U.S. PATENT DOCUMENTS

| 9,077,716 | B2 | 7/2015 | Myers et al. |
| 9,530,264 | B2 | 12/2016 | Caterino et al. |
| 9,842,446 | B2 | 12/2017 | Vecchiotti et al. |
| 11,144,869 | B2 * | 10/2021 | Byron ................ G06Q 10/0833 |
| 2018/0082502 | A1 | 3/2018 | Browning et al. |
| 2018/0139210 | A1 * | 5/2018 | Gideon, III ............. H04L 67/22 |
| 2020/0202647 | A1 * | 6/2020 | Zhong .................. H04B 17/318 |
| 2021/0068018 | A1 * | 3/2021 | Kim ...................... H04W 36/14 |

FOREIGN PATENT DOCUMENTS

| CN | 103019181 | 4/2013 |
| CN | 105957198 | 9/2016 |

OTHER PUBLICATIONS

Bauer, L. et al., Lessons Learned from the Deployment of a Smartphone-based Access-control System, (Research Paper), Jul. 18-20, 2007, 12 Pgs.

* cited by examiner

*Primary Examiner* — Benjamin A Kaplan
(74) *Attorney, Agent, or Firm* — Hewlett Packard Enterprise Patent Department (57) ABSTRACT

Examples described herein provide network enabled control of a security device. Examples include determining that a client device is connected to a network, receiving a request from the client device to instruct a security device to perform an action, wherein the request comprises a key, authenticating the key received from the request, and based on the determination that the client device is authorized to connect to the network, and based on the authentication of the key, sending, by a network device, a signal to instruct the security device to perform the action.

21 Claims, 6 Drawing Sheets

NETWORK ENABLED CONTROL OF SECURITY DEVICES

BACKGROUND

In recent years, the Internet of things (IoT) has attracted a great deal of attention from industry. The IoT is a networking capability which allows interconnected objects or devices to communicate with each other via the Internet. Moreover, IoT-enabled mobile devices, such as smartphones, laptops, and tablets, have allowed users to gain secured access to various information and services over the Internet, such as bank accounts, virtual wallets, and health records.

A security system may comprise at least one security device. A security device is a physical device which can control access to or monitor at least one area associated with a security system. For example, a security system for a room may comprise a lock, mounted on a door, which can control access to inside of the room by the door. Moreover, in such example, the security system for the room may further comprise a camera, mounted on an inside wall of the room, which can monitor the inside of the room.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

An access card-based security system may comprise at least one security device which can be controlled using at least one access card. In an access card-based security system, the at least one access card may be, for example, of passive or active type, of magnetic type, of radio-frequency identification (RFID) type, of contact or contactless type, of proximity type, or the like, or a combination thereof.

Recently, there have been efforts to develop security systems that use an IoT-enabled mobile device to control at least one security device. Such IoT-based security systems provide at least the following advantages over access card-based security systems. First, IoT-based security systems may be less burdensome than access card-based security systems. For example, whereas IoT-based security systems allow users to use an IoT-enabled mobile device, such as their smartphones, to control a security device, access card-based security systems require users to use a separate access card to control a security device. This requirement of access-card based security systems can be burdensome, especially when users must carry and keep track of numerous other access cards, such as credit cards, reward cards, parking permits, or the like. Second, IoT-based security systems may be less vulnerable to security threats than access card-based security systems. For example, whereas IoT-enabled mobile devices may include one or more access control measures (e.g., password protection, a fingerprint scanner, a facial scanner, a retinal scanner, or the like), access cards typically do not include such access control measures. Thus, for access card-based security systems, unauthorized users may easily gain access to a security device using replicated, lost, or stolen access cards. Furthermore, IoT-based security systems avoid the difficulty and inconvenience of having to replace and reassign such replicated, lost, or stolen access cards.

Despite the great potential that IoT-based security systems offer, prior approaches required a user to send a signal, by an IoT-enabled mobile device, to control the security device. To send this signal, prior approaches required the IoT-enabled mobile device to establish a communication link with the security device using a short range RF communication technology, such as Bluetooth® or a near-field communication (NFC) protocol. These requirements of prior approaches create vulnerabilities in IoT-based security systems, for at least the following reasons. First, such IoT-based security systems may not be a closed-loop system, since the IoT-enabled mobile device must establish a communication link with the security device to control the security device, but at the same time, the IoT-enabled mobile device may also be connected to an outside network (e.g., a cellular network, a Wi-Fi network, or the like). Thus, a security breach of the IoT-enabled mobile device from an outside network may lead to vulnerabilities in the security device, via a communication link between the IoT-enabled mobile device and the security device. Second, for such IoT-based security systems, eavesdropping, data corruption, interception attacks, and physical theft of the IoT-enabled mobile device may lead to unauthorized control of the security device.

To address these issues, examples described herein provide network enabled control of a security device. In such examples, a security system may determine that a client device is connected to a network, and receive a request from the client device to instruct a security device to perform an action, wherein the request comprises a key. In such examples, the security system may authenticate the key received from the request, and based on the determination that the client device is authorized to connect to the network, and based on the authentication of the key, send, by the network device, a signal to instruct the security device to perform the action.

In this manner, examples described herein may control a security device in a more secured manner than in prior approaches. For example, the signal to instruct the security device to perform the action is sent by the network device, rather than by an IoT-enabled mobile device, thereby avoiding requiring an IoT-enabled mobile device to establish a communication link with the security device to control the security device. Thus, examples described herein may be a closed-loop system in which the security device is less vulnerable to security threats from an outside network. Moreover, examples described herein may improve authentication of a request from an IoT-enabled mobile device to control the security device, by determining that the IoT-enabled mobile device is authorized to connect to the network, and by authenticating the key received from the request. Furthermore, examples described herein are less vulnerable to unauthorized control of the security device via eavesdropping, data corruption, interception attacks, and physical theft of an IoT-enabled mobile device.

Figure 1:
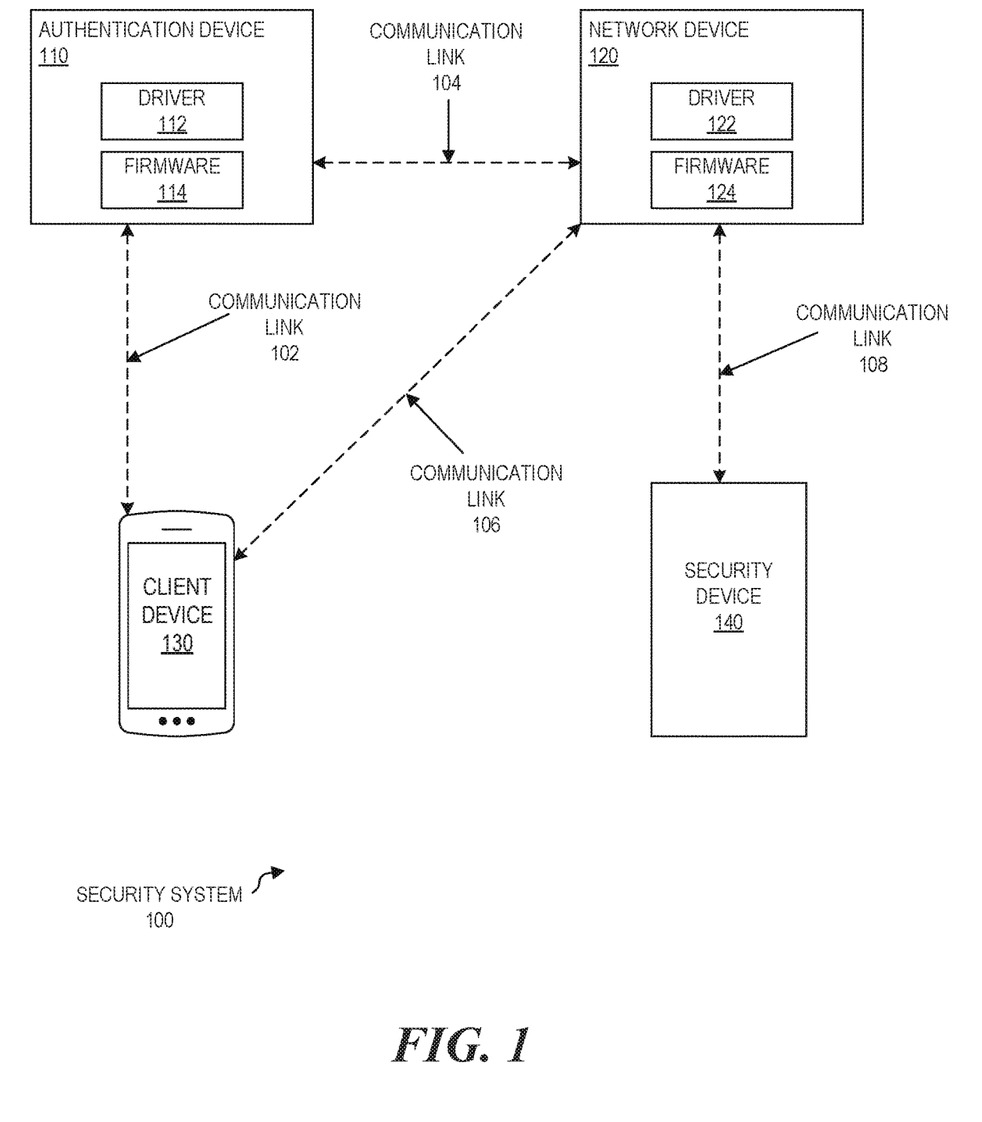
FIG. 1 is a block diagram for an example security system for network enabled control of a security device.

Referring now to the drawings, FIG. 1 is a block diagram of an example security system 100 for network enabled control of security device 140. In the example of FIG. 1, security system 100 may include authentication device 110, network device 120, client device 130, and security device 140. In the example of FIG. 1, driver 112 and firmware 114 may execute on authentication device 110, and driver 122 and firmware 124 may execute on network device 120. Driver 112 and firmware 114 may comprise one or more instructions stored on at least one non-transitory machine-readable storage medium which are executable by at least one processing resource. Driver 122 and firmware 124 may comprise one or more instructions stored on at least one non-transitory machine-readable storage medium which are executable by at least one processing resource.

In the example of FIG. 1, communication links 102, 104, 106, and 108 allow communication between devices of security system 100. As shown in FIG. 1, communication link 102 allows communication between authentication device 110 and client device 130, communication link 104 allows communication between authentication device 110 and network device 120, communication link 106 allows communication between network device 120 and client device 130, and communication link 108 allows communication between network device 120 and security device 140. In examples described herein, communication between at least two devices of security system 100 may comprise sending or receiving of signals (e.g., transmitting data) between the at least two devices. In examples described herein, communication between at least two devices of security system 100 may comprise direct or indirect communication between the at least two devices.

In some examples, communication links 102, 104, 106, and 108 may use any suitable data transmission protocol(s), including at least one connection-oriented protocol such as Transmission Control Protocol (TCP), at least one connectionless protocol such as User Datagram Protocol (UDP), or the like, or a combination thereof. It will be understood by one skilled in the art that communication links 102, 104, and 106 may use any suitable type(s) of data transmission protocol(s), now known or later developed. In some examples, one or more communication links 102, 104, and 106 may comprise at least one wired link, such as a wire, a cable, an optical fiber, or the like, or a combination thereof. Alternatively, one or more communication links 102, 104, and 106 may comprise at least one wireless link, such as a Wi-Fi-based link, a cellular-based link, or the like, or a combination thereof. Alternatively, one or more communication links 102, 104, and 106 may comprise a combination of at least one wired link and at least one wireless link. It will be understood by one skilled in the art that one or more communication links 102, 104, and 106 may use any suitable type(s) of wired and/or wireless link(s), now known or later developed. In some examples, communication link 108 may comprise at least one wireless link based on at least one RF communication technology, such as ZigBee®, Z-Wave®, Bluetooth®, Bluetooth® Low Energy, or the like, or a combination thereof. It will be understood by one skilled in the art that communication link 108 may use any suitable type(s) of wireless link(s), now known or later developed.

In the example of FIG. 1, security system 100 may register client device 130. In such examples, security system 100 may register client device 130 using at least one server, computer, laptop, switch, router, another networking or computing device, or the like, or a combination thereof. In such examples, security device 100 may register client device 130 using at least one registration identification. In examples described herein, at least one registration identification may comprise a name, an address, a phone number, a credit card number, a photocopy of a driver's license, a photocopy of a passport, a photograph of a user, or the like, or a combination thereof.

In the example of FIG. 1, client device 130 may be connected to at least one network associated with security system 100. In such examples, client device 130 may comprise an IoT-enabled mobile device. For example, client device 130 may comprise a smartphone, a laptop, a tablet, or the like. In examples described herein, at least one network associated with security system 100 may include, for example, a local area network (LAN), a virtual LAN (VLAN), a wireless local area network (WLAN), a virtual private network (VPN), the Internet, or the like, or a combination thereof.

In some examples, client device 130 may be registered by a registration interface of security system 100. In such examples, the registration interface may be connected to at least one network associated with security system 100. For example, the registration interface may comprise a web page that can be accessed by client device 130 and is connected to a network associated with security system 100. In some examples, the registration interface may comprise one or more instructions executed on client device 130. For example, the registration interface may comprise an application that can be executed on client device 130. It will be understood by one skilled in the art that client device 130 may be registered via any suitable method(s), now known or later developed.

In some examples, client device 130 may comprise at least one access control measure. In examples described herein, at least one access control measure of client device 130 may comprise password protection, a fingerprint scanner, a facial scanner, a retinal scanner, or the like, or a combination thereof.

In the example of FIG. 1, security device 140 may comprise at least one physical device which can control access to or monitor at least one area associated with security system 100. In examples described herein, at least one physical device of security device 140 may comprise a lock, a bolt, a lever, a latch, a magnet, a motion sensor, a thermal sensor, an acoustic sensor, a camera, or the like, or a combination thereof. It will be understood that security device 140 may comprise any suitable physical device(s), now known or later developed, which can control access to or monitor at least one area associated with security system 100. In such examples, security device 140 may be connected to at least one network associated with security system 100.

In the example in FIG. 1, authentication device 110 may determine whether client device 130 is authorized to connect to at least one network associated with security system 100. In some examples, authentication device 110 may comprise at least one server, computer, laptop, switch, router, another networking or computing device, or the like, or a combination thereof. In such examples, authentication device 110 may be connected to at least one network associated with security system 100. In such examples, authentication device 110 may determine whether client device 130 is authorized to connect to at least one network associated with security system 100 using at least one networking protocol. In examples described herein, at least one networking protocol may comprise Remote Authentication Dial-in User Service (RADIUS) Protocol, User Datagram Protocol (UDP), Challenge Handshake Authorization Protocol (CHAP), Point-to-Point Protocol (PPP), Extensible Authentication Protocol (EAP), or the like, or a combination thereof. It will be understood by one skilled in the art that client device 130 may use any suitable type(s) of network protocol(s), now known or later developed, to determine whether client device 130 is authorized to connect to at least one network associated with security device 100.

In some examples, authentication device 110 may generate at least one key associated with client device 130. In examples described herein, at least one key may comprise at least one password, such as an alphanumeric password, or the like. In examples described herein, at least one key may comprise public key infrastructure (PKI), public key cryptography, certificate-based authentication, secure socket layer (SSL) authentication, or the like, or a combination thereof. In examples described herein, at least one key may be generated using a hash function. In examples described herein, at least one key may comprise at least one identification associated with client device 130. In examples described herein, at least one identification associated with client device 130 may be based on a media access control (MAC) address of client device 130, a location associated with client device 130, a date associated with client device 130, a time associated with client device 130, an access code received by client device 130, or the like, or a combination thereof. In examples described herein, at least one identification associated with client device 130 may be based on a facial recognition associated with a user, a location associated with a user, a date associated a user, a time associated with a user, or the like, or a combination thereof. In such examples, at least one identification associated with client device 130 may comprise at least one registration identification associated with client device 130. In examples described herein, at least one key may comprise at least one dynamic key having at least one value that changes after a predetermined time period. In such examples, the at least one dynamic key may be based on at least one identification associated with client device 130. It will be understood by one skilled in the art that at least one key associated with client device 130 may comprise any suitable type(s) of key(s), now known or later developed.

In some examples, authentication device 110 may store, into at least on repository associated with security system 100, at least one data item comprising at least one key associated with client device 130. In such examples, the at least one key associated with client device 130 may be the same as at least one key generated by authentication device 110. In such examples, the at least one key associated with client device 130 may correspond to, but not necessarily be the same as, the at least one key generated by authentication device 110. In such examples, the at least one data item may further comprise at least one credential associated with client device 130. In examples herein, at least one credential may comprise a MAC address of client device 130, a username, a password, or the like, or a combination thereof. It will be understood by one skilled in the art that the at least one credential associated with client device 130 may comprise any suitable type(s) of credential(s), now known or later developed. In such examples, the at least one repository associated with security system 100 may comprise at least one non-transitory machine-readable storage medium. In such examples, authentication device 110 may comprise the at least one repository. In such examples, authentication device 110 may communicate with the at least one repository via at least one network associated with security system 100.

In some examples, client device 130 may store, into at least one repository associated with security system 100, at least one data item comprising at least one key associated with client device 130. In such examples, the at least one key associated with client device 130 may be the same as at least one key generated by authentication device 110. In such examples, the at least one key associated with client device 130 may correspond to, but not necessarily be the same as, the at least one key generated by authentication device 110. In such examples, the at least one data item may further comprise at least one credential associated with client device 130. In such examples, the at least one repository associated with security system 100 may comprise at least one non-transitory machine-readable storage medium. In such examples, client device 130 may comprise the at least one repository. In such examples, client device 130 may communicate with the at least one repository via at least one network associated with security system 100.

In the example of FIG. 1, authentication device 110 may receive a request from client device 130 to instruct security device 140 to perform an action. In such examples, the request may comprise one or more machine-readable instructions that can be executed by at least one processing resource of authentication device 100. It will be understood by one skilled in the art that the request may be received in any suitable format(s), now known or later developed, and at any suitable time(s). In such examples, the request may comprise at least one key associated with client device 130, wherein the at least one key of the request is the same as or corresponds to at least one key stored on the repository associated with client device 130. In such examples, the at least one key received from the request may be the same as or correspond to at least one key generated by authentication device 110. It will be understood by one skilled in the art that the at least one key received from the request may comprise any suitable type(s) of key(s), now known or later developed. In such examples, authentication device 110 may authenticate at the least one key received from the request.

In the example of FIG. 1, authentication device 110 may determine whether the request from client device 130 is valid. In such examples, authentication device 110 may deny the request, based on a determination that the request is not valid. Moreover, in such examples, authentication device 110 may send a signal to network device 120, to instruct network device 120 to instruct security device 140 to perform the action, based on a determination that the request is valid. In such examples, authentication device 110 may determine that the request is valid, based on a determination that client device 130 is authorized to connect to at least one network associated with security system 100, or based on an authentication of the at least one key received from the request, or a combination thereof.

In the example of FIG. 1, network device 120 may receive a signal from authentication device 110 to instruct network device 120 to instruct security device 140 to perform the action. In such examples, network device 120 may engage in any network data transmission operations, including, but not limited to, switching, routing, bridging, or a combination thereof. In such examples, network device 120 may comprise at least one wireless access point (WAP). In such examples, network device 120 may be connected to at least one network associated with security system 100.

In the example of FIG. 1, network device 120 may send a signal to control security device 140. In such examples, network device 120 may receive, from authentication device 110, one or more instructions to instruct security device 140 to perform the action. Moreover, in such examples, network device 120 may send a signal to security device 140 to instruct security device 140 to perform the action. In such examples, the action may comprise locking, unlocking, opening, closing, enabling, disabling, turning on, turning off, or reprogramming of security device 140, or the like, or a combination thereof. It will be understood by one of ordinary skill in the art that any suitable action(s), now known or later developed, may be performed to control security device 140.

In this manner, security system 100 provides network enabled control of security device 140 in a more secured manner than in prior approaches. For example, security system 100 does not require client device 130 to establish a communication link with security device 140 to instruct security device 140 to perform an action. Rather, security system may send, by network device 120, a signal to instruct security device 140 to perform the action. Thus, security system 100 may instruct security device 140 to perform the action using a closed-loop system that is more secured than prior approaches. Moreover, security system 100 may improve authentication of a request from client device 130 to control security device 140, by determining that client device 130 is authorized to connect to a network, and by authenticating a key received from the request. Furthermore, in security system 100, security device 140 is less vulnerable to unauthorized control by eavesdropping, data corruption, interception attacks, and physical thefts of client device 130.

Figure 2A:
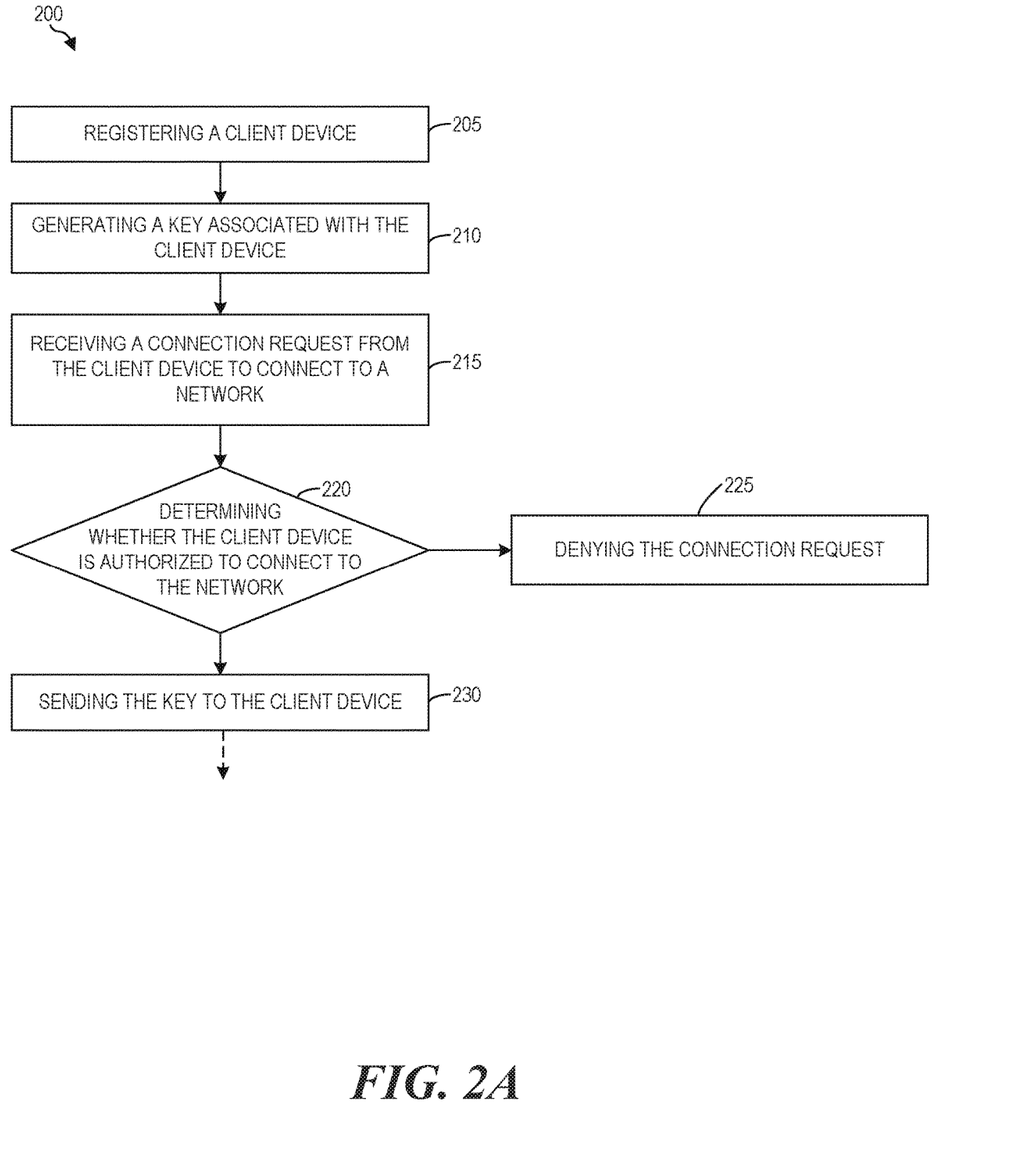
FIGS. 2A and 2B is a flowchart of an example process of network enabled control of a security device.
Figure 2B:
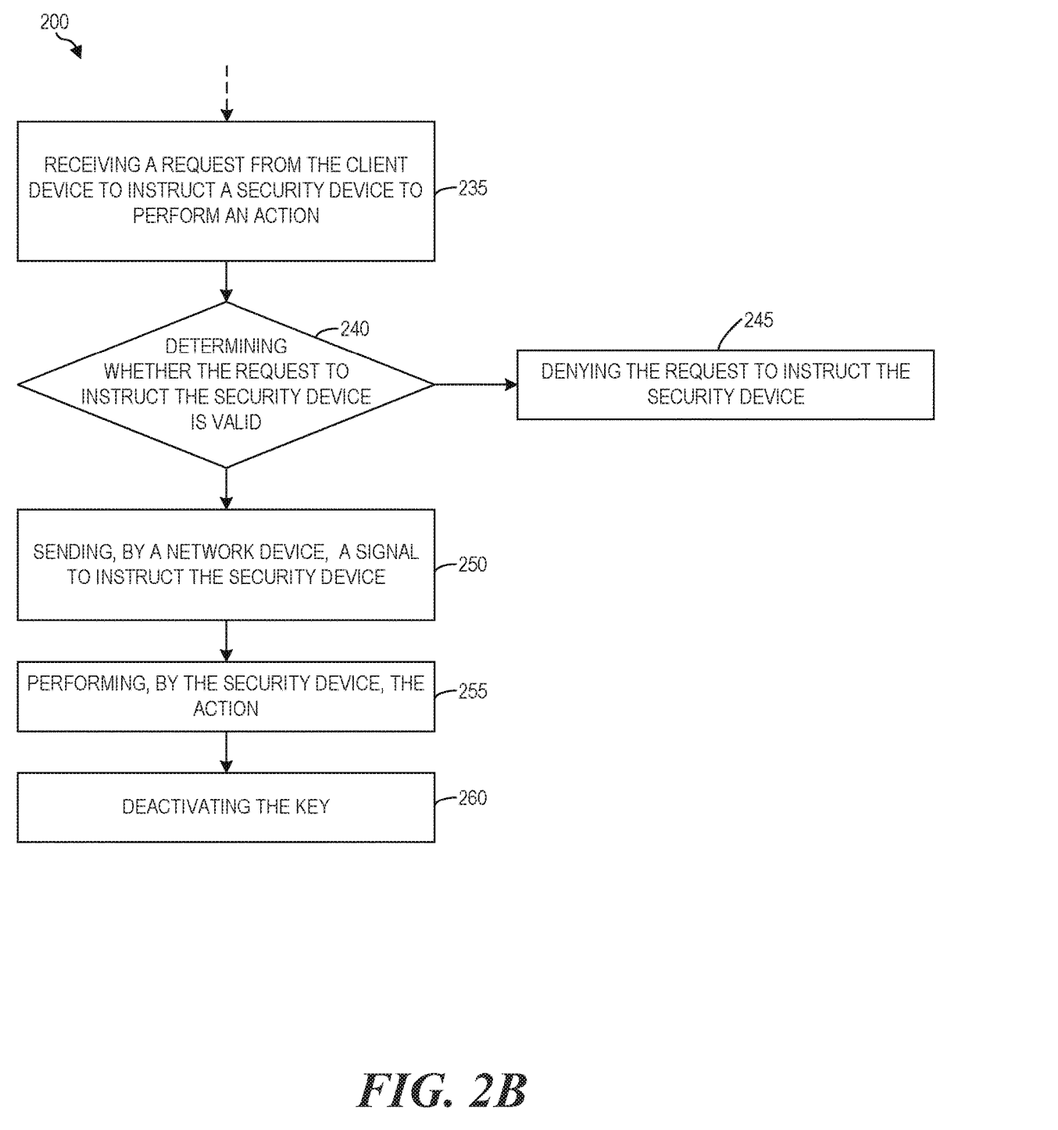

FIGS. 2A and 2B illustrate functionality 200 for a security system, according to one example. Functionality 200 may be implemented as a method or may be executed as one or more instructions on a machine (e.g., by at least one processor), where the one or more instructions are included on at least one machine-readable storage medium (e.g., a transitory or non-transitory machine readable-storage medium). While only twelve blocks are shown in functionality 200, functionality 200 may include other actions described herein. Also, some of the blocks shown in functionality 200 may be omitted without departing from the spirit and scope of this disclosure. Functionality 200 may be implemented on a security system according to any of the examples herein.

As shown in block 205, functionality 200 may include registering a client device.

In some examples, the client device may be registered by at least one device of the security system. In such examples, the client device may be registered by a registration device of the security system. In such examples, the registration device may be connected to at least one network associated with the security system. For example, at a hotel, a hotel receptionist may register a guest's smartphone for use at the hotel by using a computer located at the front desk of the hotel. In such example, the computer may be connected to the network associated with the hotel's security system.

In some examples, the client device may be registered by a registration interface. In such examples, the registration interface may be connected to at least one network associated with the security system. In such examples, the registration interface may comprise one or more instructions executed on the client device. For instance, in the hotel example, the guest may register his or her smartphone for use at the hotel by using a website that is connected to the network associated with the hotel's security system. Alternatively, in the hotel example, the guest may register his or her smartphone by using a registration application that is installed on his or her smartphone, wherein the registration application may connect to the network associated with the hotel's security system.

In some examples, the client device may be registered by providing at least one registration identification at a registration device, at a registration interface, or a combination thereof, or at any suitable device or component, now known or later developed. In such examples, the client device may send the at least one registration identification via at least one network associated with the security system. For instance, in the hotel example, the guest may register his or her smartphone by uploading a digital photograph of his or her face by using the registration application installed on his or her smartphone. In such example, the digital photograph of the guest's face may be captured by using a camera device on the guest's smartphone.

In some examples, the client device may be registered by providing at least one credential associated with the client device. For instance, in the hotel example, the guest may register his or her smartphone by entering a username and password into the registration application, wherein the username and password have been assigned to the guest by the hotel.

As shown in block 210, functionality 200 may include generating a key associated with the client device.

In some example, the key may be generated by at least one device of the security system. In such examples, the key may be generated by the authentication device. In such examples, the key may be generated using a hash function. In such examples, the key may comprise at least one identification associated with the client device. For instance, in the hotel example, after the guest registers his or her smartphone for use at the hotel, an authentication device of the hotel's security system may generate a key using a hash function and based on the MAC address of the guest's smartphone. In such example, the key may also comprise information about a location of a hotel room assigned to the guest and may comprise the digital photograph of the guest's face which was uploaded during registration of the guest's smartphone.

In some examples, generating the key associated with client device may further comprise storing, into at least one repository associated with the security system, at least one data item comprising the key. In such examples, the at least data item may comprise at least one credential associated with the client device. For instance, in the hotel example, the key, the username, and the password associated with the client device may be stored as a data item into a storage medium of the authentication device.

In some examples, generating the key associated with the client device may comprise generating a dynamic key comprising at least one value that changes after a predetermined time period. For instance, in the hotel example, after the guest registers his or her smartphone for use at the hotel, the authentication device may generate a dynamic key comprising a value that changes as a function of time.

As shown in block 215, functionality 200 may include receiving a connection request from the client device to connect to a network.

In some examples, the connection request may be received by at least one device of the security system. In such examples, the connection request may be received by the authentication device, by a network device, or any other suitable device of the security system that is connected to the network. In such examples, the network may be at least one network associated with the security system. For instance, in the hotel example, after the guest registers his or her smartphone for use at the hotel, the guest may then submit a connection request, using his or her smartphone, to connect to the hotel's guest Wi-Fi network. In such example, the connection request is received by the authentication device via the network associated with the hotel's security system.

In some examples, the connection request may be received at the authentication device by receiving, at a network device of the security system, the connection request, and then sending, by the network device, the connection request to an authentication device. For instance, in the hotel example, the authentication device may receive the connection request from the guest's smartphone to connect to the hotel's guest Wi-Fi network by receiving, at a WAP connected to the network associated with the hotel's security system, the connection request, and then sending, by the WAP, the connection request to the authentication device.

In some examples, the connection request received from the client device to connect to the network may further comprise at least one credential associated with the client device. For instance, in the hotel example, the guest's connection request may comprise the MAC address of the guest's smartphone and the username and password assigned to the guest.

As shown in block 220, functionality 200 may include determining whether the client device is authorized to connect to the network.

In some examples, at least one device of the security device may determine whether the client device is authorized to connect to the network. In such examples, the authentication device may determine whether the client device is authorized to connect to the network. In such examples, the authentication device may determine whether at least one credential associated with the client device, received from the connection request, is associated with the client device. For instance, in the hotel example, the authentication device may determine whether the guest's smartphone is authorized to connect to the guest Wi-Fi network by authenticating the MAC address of the guest's smartphone and the username and password received from the guest's connection request.

At block 220, if it is determined that the client device is not authorized to connect to the network, then functionality 200 proceeds to block 225. At block 220, if it is determined that the client device is authorized to connect to the network, then functionality 200 proceeds to block 230.

In some examples, it is determined that the client device is not authorized to connect to the network, at block 220, by determining that at least one credential, received from the connection request, is not associated with the client device. In some examples, it is determined that the client device is authorized to connect to the network, at block 220, by determining that at least one credential, received from the connection request, is associated with the client device. For instance, in the hotel example, the authentication device may determine that the guest's smartphone is not authorized to connect to the guest Wi-Fi network by determining that at least one of the MAC address, the username, and the password received from the guest's connection request is not associated with the guest's smartphone. Moreover, in the hotel example, the authentication device may determine that the guest's smartphone is authorized to connect to the guest Wi-Fi network by determining that the MAC address, the username, and the password received from the guest's connection request are associated with the guest's smartphone.

As shown in block 225, functionality 200 may include denying the connection request.

In some examples, the connection request may be denied by at least one device of the security system. In such examples, the connection request may be denied by the authentication device. In some examples, the connection request may be denied based on a determination that the client device is not authorized to connect to the network. For instance, in the hotel example, the authentication device may deny the guest's connection request based on a determination that the guest's smartphone is not authorized to connect to the guest Wi-Fi network.

In some examples, denying the connection request may further comprise sending, by the authentication device, a notification to the client device that the connection request has been denied. In such examples, denying the connection request may comprise receiving, at a network device of the security system, one or more instructions from the authentication device notify to the client device that the connection request has been denied, and then sending, by the network device, the notification to the client device that the connection request has been denied. For instance, in the hotel example, after the authentication device denies the guest's connection request, a WAP connected to the network associated with the hotel's security system may receive one or more instructions from the authentication device to notify the guest's smartphone that the connection request has been denied, and then the WAP may send a notification to the guest's smartphone that the guest's connection request has been denied.

As shown in block 230, functionality 200 may include sending the key to the client device.

In some examples, the key may be sent to the client device by at least one device of the security system. In such examples, the key may be sent to the client device by the authentication device. In some examples, sending the key to the client device may be based on a determination that the client device is authorized to connect to the network. For instance, in the hotel example, the authentication device may send the key to the guest's smartphone, based on a determination that the guest's smartphone is authorized to connect to the guest Wi-Fi network.

In some examples, the key may be sent to the client device by receiving, at a network device of the security system, the key from the authentication device, and then sending, by the network device, the key to the client device. For instance, in the hotel example, the key may be sent to the guest's smartphone by receiving, at a WAP connected to the network associated with the hotel's security system, the key from the authentication device, and then sending, by the WAP, the key to the guest's smartphone.

In some examples, sending the key to the client device may further comprise storing, into at least one repository associated with the security system, at least one data item comprising the key. In such examples, the at least one data item may comprise at least one credential associated with the client device. For instance, in the hotel example, the key, the username, and the password received from the guest's connection request may be stored as a data item into a storage medium of the guest's smartphone.

As shown in block 235, functionality 200 may include receiving a request from the client device to instruct a security device to perform an action.

In some examples, at least one device of the security system may receive the request from the client device to instruct the security device to perform the action. In such examples, the authentication device may receive the request from the client device. In such examples, the authentication device may receive the request from the client device by receiving, at a network device, the request, and then sending, by the network device, the request to the authentication device. For instance, in the hotel example, the authentication device may receive a request from the guest's smartphone to instruct a security device to perform an action. In such example, the security device may comprise a Zigbee®- enabled security lock on the front door of the guest's assigned hotel room, and the request may comprise instructions to unlock the Zigbee®-enabled security lock. Alternatively, in such example, the security device may comprise a Zigbee®-enabled security safe located inside of the guest's assigned hotel room, and the request may comprise instructions to open the Zigbee®-enabled security safe. Moreover, in the hotel example, the authentication device may receive the request from the guest's smartphone by receiving, at a WAP connected to the network associated with the hotel's security system, the request, and then sending, by the WAP, the request to the authentication device In some examples, the request to instruct the security device may comprise a key associated with the client device. In such examples, the key of the request may be the same as or correspond to the key sent to the client device, at block 230. In such examples, the request may comprise at least one data item stored on at least one repository associated with the security system. For instance, in the hotel example, the guest's request to instruct the security device may comprise the data item that is stored on the storage medium of the guest's smartphone, wherein the data item comprises the key, the username, and the password received from the guest's connection request.

In some examples, the request to instruct the security device may comprise at least one identification associated with client device. For instance, in the hotel example, guest's request to instruct the security device may comprise information about the current location of the guest's smartphone. Moreover, in such example, the guest's request may comprise an uploaded digital photograph of the guest's face which was captured using the camera device on the guest's smartphone.

As shown in block 240, functionality 200 may include determining whether the request to instruct the security device is valid.

In some examples, at least one device of the security system may determine whether the request to instruct the security device is valid. In such examples, it may be determined whether the request is valid by authenticating, by the authentication device, the key associated with the client device that is received from the request. In such examples, it may be determined whether the request is valid by authenticating, by the authentication device, the at least one data item that is received from the request. In such examples, authenticating the key received from the request comprises comparing the key with the at least one data item stored the at least one repository associated with the authentication device. For instance, in the hotel example, determining whether the guest's request to instruct the security device is valid may comprise authenticating, by the authentication device, the key, the username, and the password received from the guest's request. In such example, authenticating the key, the username, and the password received from the guest's request may comprise comparing the key, the username, and the password received from the guest's request with the data item that is stored on the storage medium of the authentication device.

In some examples, it may be determined whether the request to instruct the security device is valid by authenticating at least one identification associated with the client device received from the request. In such examples, authenticating the at least one identification received from the request may comprise comparing the at least one identification with at least one data item stored the at least one repository associated with the security device. For instance, in the hotel example, it may be determined whether the guest's request to instruct the security device is valid by authenticating, by the authentication device, the guest's location and facial identity. In such example, the guest's location and facial identity may be authenticated by comparing the guest's request, which comprises information about the current location of the guest's smartphone and the uploaded digital photograph of the user's face, with the data item stored on the storage medium of the authentication device, which comprises information about the location of the guest's assigned hotel room and the digital photograph of the user's face which was uploaded during registration of the guest's smartphone.

At block 240, if it is determined that the request to instruct the security device is not valid, then functionality 200 proceeds to block 245. At block 220, if it is determined that the request to instruct the security device is valid, then functionality 200 proceeds to block 250.

In some examples, it is determined that the request to instruct the security device is not valid, at block 240, by determining that the key received from the request is not the same or does not correspond to the key of the at least one data item stored the at least one repository associated with the security device. In some examples, it is determined that the request to instruct the security device is not valid, at block 240, by determining that the at least one credential associated with the client device received from the request is not the same or does not correspond to the at least one credential of the at least one data item. For instance, in the hotel example, it is determined that the guest's request to instruct the security device is not valid by determining, by the authentication device, that at least one of the key, the username, and the password received from the guest's request is not the same as at least one of the key, the username, and the password of the data item that is stored on the storage medium of the authentication device.

In some examples, it is determined that the request to instruct the security device is not valid, at block 240, by determining that at least one identification of the key received from the request is not the same or does not correspond with at least one data item stored the at least one repository associated with the security device. For instance, in the hotel example, it may be determined that the guest's request to instruct the security device is not valid by determining that the guest's request, which comprises information about the current location of the guest's smartphone and the uploaded photograph of the guest's face, is not the same or does not correspond to the data item stored on the storage medium of the authentication device, which comprises information about the location of the guest's hotel room and the digital photograph of the guest's face which was uploaded during registration of the guest's smartphone.

In some examples, it is determined that the request to instruct the security device is not valid, at block 240, by determining that the key received from the request has been deactivated. In such examples, the key received from the request may be deactivated after a predetermined time period, or based on at least one identification associated with the client device, or a combination thereof. For instance, in the hotel example, it is determined that the guest's request to instruct the security device is not valid by determining, by the authentication device, that at least one of the key, the username, and the password received from the guest's request has expired.

In some examples, it is determined that the request to instruct the security device is valid, at block 240, by determining that the key received from the request is the same or corresponds to the key of the at least one data item stored the at least one repository associated with the security device. In some examples, it is determined that the request to instruct the security device is valid, at block 240, by determining that the at least one credential associated with the client device received from the request is the same or corresponds to the at least one credential of the at least one data item. For instance, in the hotel example, it is determined that the guest's request to instruct the security device valid by determining, by the authentication device, that the key, the username, and the password received from the guest's request to instruct the security device are the same as the key, the username, and the password from the data item that are stored on the storage medium of the authentication device.

In some examples, it is determined that the request to instruct the security device is valid, at block 240, by determining that at least one identification of the key received from the request is the same or corresponds to at least one data item stored the at least one repository associated with the security device. For instance, in the hotel example, it may be determined that the guest's request is valid to instruct the security device is valid by determining that the guest's request, which comprises information about the current location of the guest's smartphone and the uploaded photograph of the guest's face, is the same or corresponds to the data item stored on the storage medium of the authentication device, which comprises information about the location of the guest's hotel room and the digital photograph of the guest's face which was uploaded during registration of the guest's smartphone.

In some examples, it is determined that the request to instruct the security device is valid, at block 240, by determining that the key received from the request is active. In such examples, the key received from the request may be active for a predetermined time period, or based on at least one identification associated with the client device, or a combination thereof. For instance, in the hotel example, it is determined that the guest's request to instruct the security device is valid by determining, by the authentication device, that the key, the username, and the password received from the guest's request have not expired.

As shown in block 245, functionality 200 may include denying the request to instruct the security device.

In some examples, at least one device of the security device may deny the request. In such examples, the authentication device may deny the request. In such examples, denying the request to instruct the security device may comprise receiving, at a network device, one or more instructions from the authentication device to instruct the network device to deny the request, and then sending, by the network device, a notification to the client device that the request has been denied. For instance, in the hotel example, denying the guest's request to instruct the security device may comprise receiving, at a WAP connected to the network associated with the hotel's security system, one or more instructions from the authentication device to deny the guest's request, and then sending, by the WAP, a notification to the guest's smartphone that the guest's request has been denied.

As shown in block 250, functionality 200 may include sending, by a network device, a signal to instruct the security device to perform the action.

In some examples, the signal to instruct the security device may be sent by receiving, at a network device, one or more instructions from the authentication device to instruct the security device, and then sending, by the network device, the signal to instruct the security device to perform the action. For instance, in the hotel example, sending the signal to instruct the security device may comprise receiving, at a WAP connected to the network associated with the hotel's security system, one or more instructions from the authentication device to instruct the security device to perform the action, and then sending, by the WAP, the signal to instruct the security device to perform the action.

In some examples, sending, by a network device, the signal to instruct the security device may comprise sending the signal by at least one server, computer, laptop, switch, router, another networking or computing device, or the like, or a combination thereof, of the security system. For example, the signal to instruct the security device may be sent by the authentication device. For instance, in the hotel example, sending the signal to instruct the security device may comprise sending, by the authentication device, the signal to the security device to instruct the security device to perform the action.

In some examples, sending the signal to instruct the security device to perform the action may be based on a determination that the client device is authorized to connect to the network, at block 220. In some examples, sending the signal to instruct the security device to perform the action may be based on a determination that the request to instruct the security device is valid, at block 240. For instance, in the hotel example, sending the signal to instruct the security device may be based on a determination that the guest's smartphone is authorized to connect to the hotel's guest Wi-Fi network, and based on a determination that the guest's request to instruct the security device is valid.

As shown in block 255, the functionality 200 may include performing, by the security device, the action.

In some examples, the action may comprise locking, unlocking, opening, closing, enabling, disabling, turning on, turning off, or reprogramming of the security device, or the like, or a combination thereof. It will be understood by one skilled in the art that any suitable action(s), now known or later developed, may be performed to control the security device. For instance, in the hotel example, the security device may comprise a ZigBee®-enabled security lock, wherein the action may comprise unlocking the ZigBee®-enabled security lock. Alternatively, in the hotel example, the security device may comprise a ZigBee®-enabled safe, wherein the action may comprise opening the ZigBee®-enabled safe. Alternatively, in the hotel example, the security device may comprise a ZigBee®-enabled camera, wherein the action may comprise disabling the ZigBee®-enabled camera.

As shown in block 260, the functionality 200 may include deactivating the key.

In some example, the key may be deactivated by at least one device of the security system. In such examples, the key may be deactivated by the authentication device. In such examples, deactivating the key may comprise removing, from at least one repository associated with the security device, at least one data item comprising the key. For instance, in the hotel example, deactivating the key may comprise removing, by the authentication device, the data item from the storage medium of the authentication device. Moreover, in the hotel example, deactivating the key may comprise removing, by the client device, the data item from the storage medium of the client device.

In some examples, the key may be deactivated by receiving, at the authentication device, one or more instructions from the client device to instruct the authentication device to deactivate the key. In such examples, the key may be deactivated by receiving, at a network device, the one or more instructions from the client device, and then sending, by the network device, the one or more instructions to the authentication device. In such examples, the key may be deactivated by receiving, by at least one server, computer, laptop, switch, router, another networking or computing device, or the like, or a combination thereof, of the security device, the one or more instructions from the client device. For instance, in the hotel example, deactivating the key may comprise receiving, at a WAP connected to the hotel's security system, instructions from the guest's smartphone to instruct the authentication device to remove the data item from the storage medium of the authentication device, and then sending, by the WAP, the instructions to the authentication device.

In some examples, the key may be deactivated after a predetermined time period, based on at least one identification associated with the client device, or a combination thereof. For instance, in the hotel example, the data item on the storage medium of the authentication device may be automatically removed after a predetermined time period (e.g., 24 hours) has elapsed since the guest's smartphone has last been connected to the hotel's guest Wi-Fi network. Moreover, in the hotel example, the data item on the storage medium of the guest's smartphone may be automatically removed after a predetermined time period (e.g., 24 hours) has elapsed since the guest's smartphone has last been connected to the hotel's guest Wi-Fi network.

In some examples, the key may be deactivated based on a determination that the client device has been unregistered. In such examples, the client device may be unregistered by at least one device of the security system. In such examples, the client device may be deactivated by a registration device, a registration device, a registration interface, or a combination thereof, or at any suitable device or component, now known or later developed. For instance, in the hotel example, the hotel receptionist may unregister the guest's smartphone by using a computer located at the front desk of the hotel. Alternatively, in the hotel example, the guest may unregister his or her smartphone by using the registration application installed on his or her smartphone. Alternatively, in the hotel example, the guest may unregister his or her smartphone by using the website that is connected to the network associated with the hotel's security system. Moreover, in the hotel example, based on a determination by the authentication device that the guest's smartphone has been unregistered, the authentication device may then remove the data item from the storage medium of the authentication device. Furthermore, in the hotel example, based on a determination by the authentication device that the guest's smartphone has been unregistered, the guest's smartphone may then remove the data item from the storage medium of the guest's smartphone.

In this manner, functionality 200 provides network enabled control of a security device in a more secured manner than prior approaches. For example, at block 250, functionality 200 does not require establishing a communication link between the client device and the security device to instruct the security device to perform an action. Rather, at block 250, functionality 200 may include sending, by a network device, a signal to instruct the security device to perform the action. Thus, functionality 200 allows instructing the security device to perform the action using a closed-loop system that is more secured than prior approaches. Moreover, functionality 200 improves authentication of a request from a client device to control a security device, by determining whether the client device is authorized to connect to a network associated with the security device, at block 220, and by determining whether the request to instruct the security device is valid, at block 240. Furthermore, functionality 200 allows the security device to be less vulnerable to unauthorized control by eavesdropping, data corruption, interception attacks, and physical thefts of the client device.

FIGS. 3A-3D is a block diagram of an example security system 300 for network enabled control of security device 340. In the example of FIGS. 3A-3D, security system 300 includes authentication device 310, network device 320, registered client device 330, and security device 340. For the ease of understanding, many aspects of security system 300 are omitted in FIGS. 3A-3D, but security system 300 may include any element described in connection with security system 100, above.

Figure 3A:
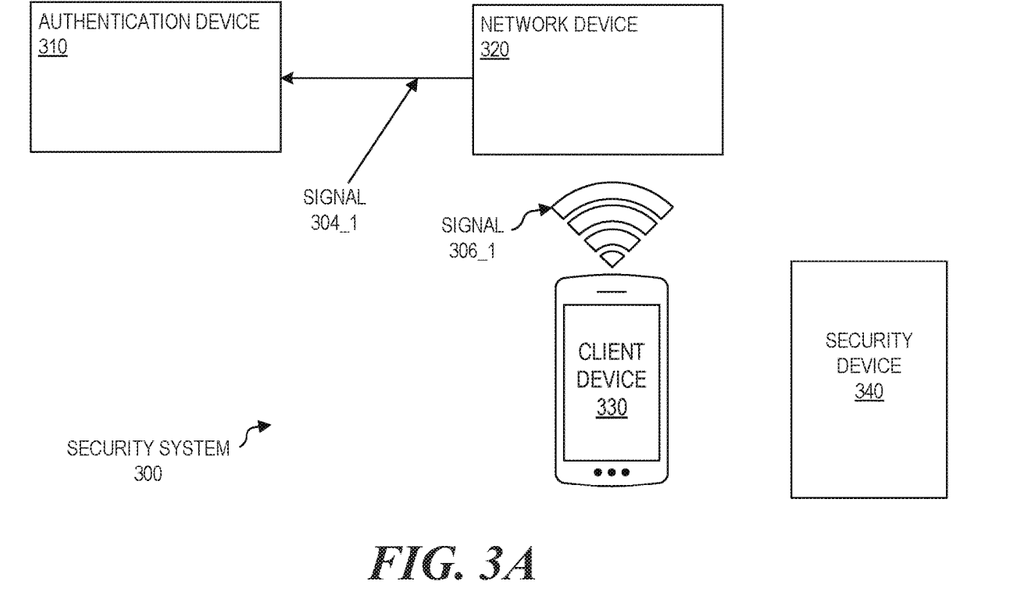
FIG. 3A-3D shows examples of network enabled control of a security device.

As shown in FIG. 3A, registered client device 330 may send signal 306_1 to network device 320 to communicate with network device 320. In such example, registered client device 330 may be registered by security system 300. In such example, signal 306_1 may be sent via at least one wireless link. Moreover, signal 306_1 may comprise a connection request from registered client device 330 to connect to a network associated with security system 300. Furthermore, network device 320 may receive, via signal 306_1, the connection request from registered client device 330 to connect to the network.

As shown in FIG. 3A, network device 320 may send signal 304_1 to authentication device 310 to communicate with authentication device 310. In such example, signal 304_1 may be sent via at least one wireless link, at least one wired link, or a combination thereof. Moreover, signal 304_1 may comprise the connection request from registered client device 330 to connect to the network. Furthermore, authentication device 310 may receive, via signal 304_1, the connection request from registered client device 330 to connect to the network.

Figure 3B:
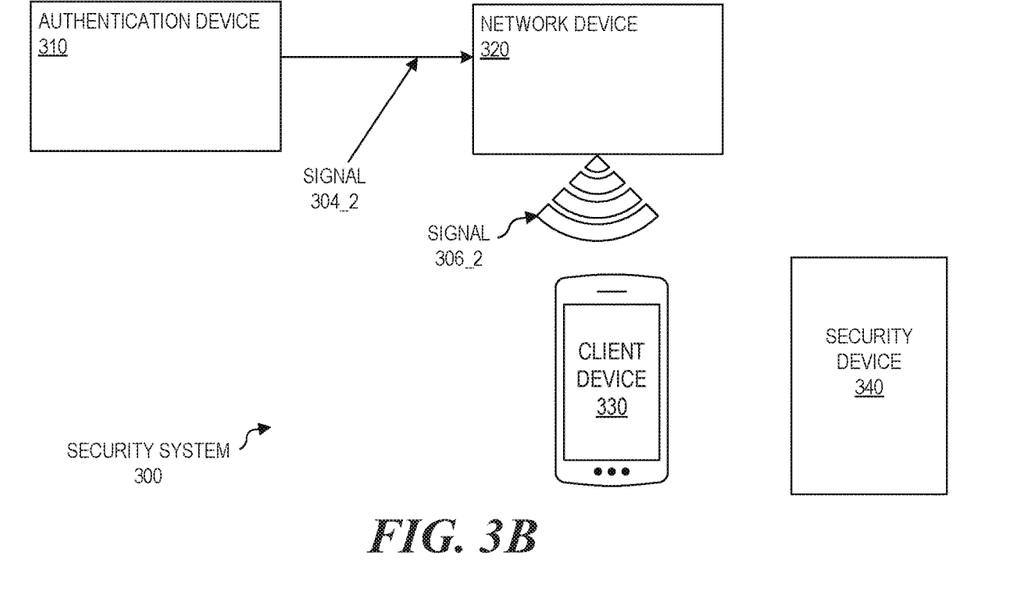

As shown in FIG. 3B, authentication device 310 may send signal 304_2 to network device 320 to communicate with network device 320. Moreover, authentication device 310 may send signal 304_2 to network device 320, based on a determination that registered client device 330 is authorized to connect to the network. In such example, signal 304_2 may be sent via at least one wireless link, at least one wired link, or a combination thereof. In addition, signal 304_2 may comprise a key associated with registered client device 330. Furthermore, network device 320 may receive, via signal 304_2, the key associated with registered client device 330.

As shown in FIG. 3B, network device 320 may send signal 306_2 to registered client device 330 to communicate with registered client device 330. Moreover, network device 320 may send signal 306_2 to registered client device 330, based on a determination that registered client device 330 is authorized to connect to the network. In such example, signal 306_2 may be sent via at least one wireless link. In addition, signal 306_2 may comprise a key associated with registered client device 330. Furthermore, registered client device 330 may receive, via signal 306_2, the key associated with registered client device 330.

Figure 3C:
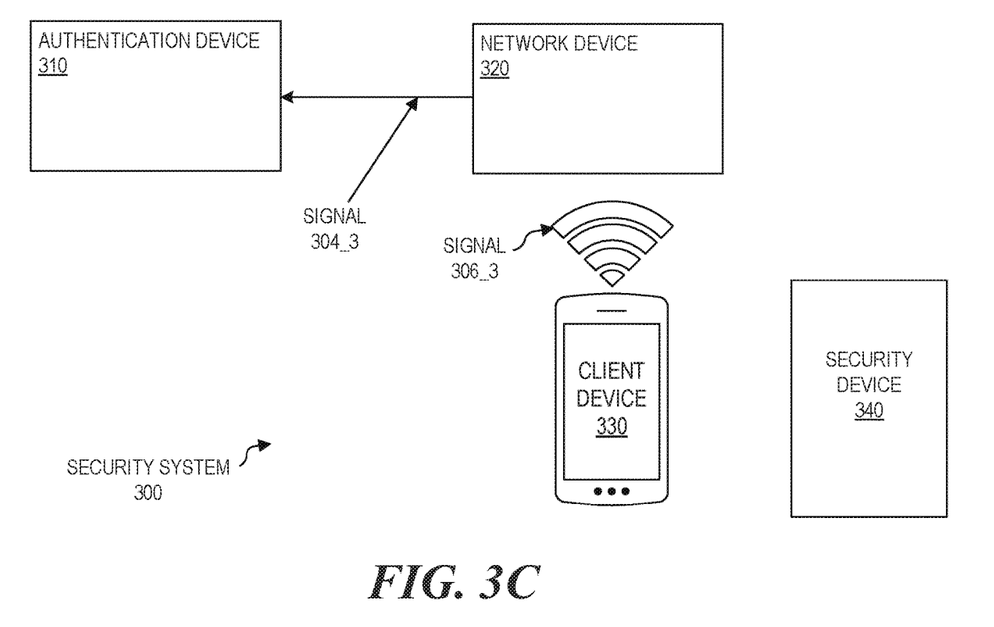

As shown in FIG. 3C, registered client device 330 may send signal 306_3 to network device 320 to communicate with network device 320. In such example, signal 306_3 may be sent via at least one wireless link. Moreover, signal 306_3 may comprise a request from registered client device 330 to instruct security device 340 to perform an action. Network device 320 may receive, via signal 306_3, the request from registered client device 330 to instruct security device 340 to perform the action.

As shown in FIG. 3C, network device 320 may send signal 304_3 to authentication device 310 to communicate with authentication device 310. In such example, signal 304_3 may be sent via at least one wireless link, at least one wired link, or a combination thereof. Moreover, signal 304_3 may comprise the request from registered client device 330 to instruct security device 340 to perform the action. Furthermore, authentication device 310 may receive, via signal 304_3, the request from registered client device 330 to instruct security device 340 to perform the action.

Figure 3D:
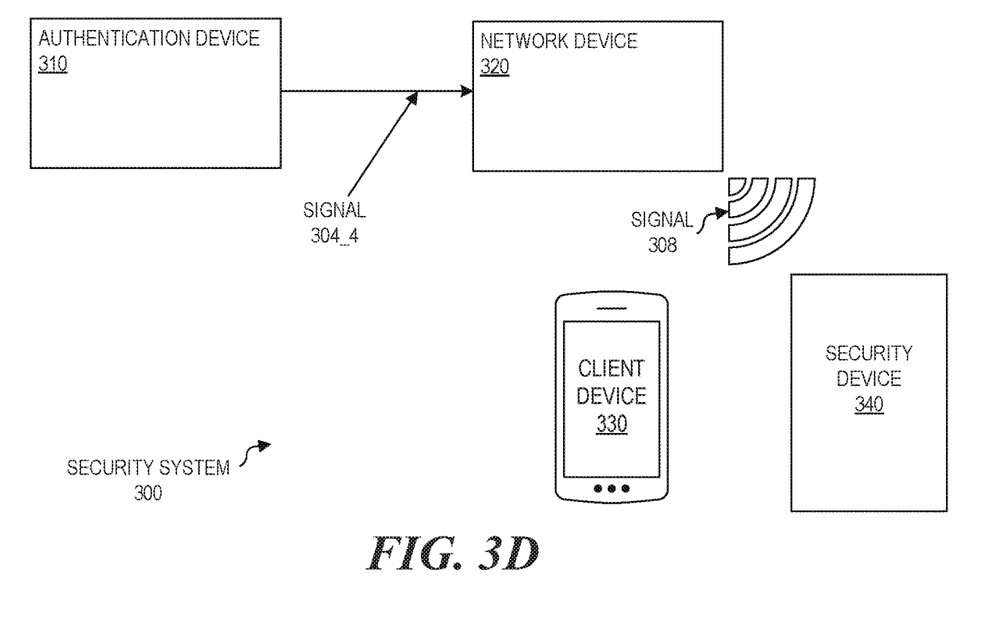

As shown in FIG. 3D, authentication device 310 may send signal 304_4 to network device 320 to communicate with network device 320. Moreover, authentication device 310 may send signal 304_4 to network device 320, based on a determination that the request is valid. In such example, signal 304_4 may be sent via at least one wireless link, at least one wired link, or a combination thereof. In addition, signal 304_4 may comprise one or more instructions to instruct security device 340 to perform the action. Furthermore, network device 320 may receive, via signal 304_4, the one or more instructions to instruct security device 340 to perform the action.

As shown in FIG. 3D, network device 320 may send signal 308 to security device 340 to communicate with security device 340. Moreover, signal 308 may comprise one or more instructions to instruct security device 340 to perform the action. In such examples, signal 308 may be sent via at least one wireless link based at least one RF communication technology. In addition, network device 320 may send the signal 308 to security device 340, based on a determination that the request is valid, and based on a determination that the registered client device 330 is authorized to connect to the network. Furthermore, security device 340 may receive, via signal 308, one or more instructions to perform the action, and security device 340 may perform the action.

In this manner, security system 300 of FIGS. 3A-3D allows network enabled control of security device 340 in a more secured manner than prior approaches. For example, security system 300 does not require registered client device 330 to establish a communication link with security device 340 to instruct security device 340 to perform the action. Rather, security device 300 may send, by network device 320, signal 308 to instruct security device 340 to perform the action. Thus, security system 300 may instruct security device 340 to perform the action based on a closed-loop system that is more secured than prior approaches. Moreover, security system 300 may improve authentication of the request from registered client device 330 to control security device 340, by determining that registered client device 330 is authorized to connect to the network associated with security system 300, and by authenticating the key received from the request. Furthermore, security device 340 is less vulnerable to unauthorized control by eavesdropping, data corruption, interception attacks, and physical thefts of the registered client device 330.

Figure 4:
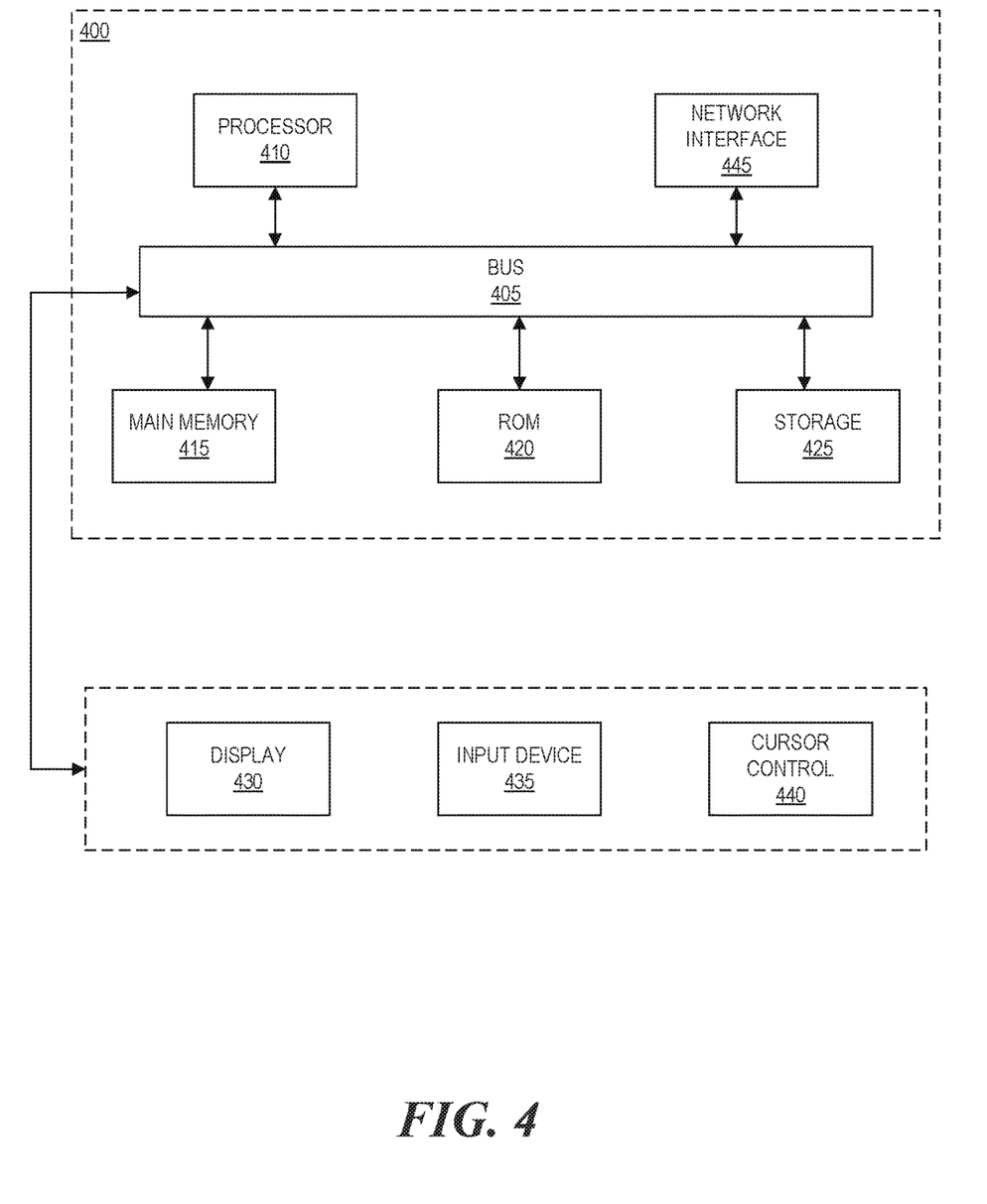
FIG. 4 is a block diagram of an example computer system in which various embodiments described herein may be implemented.

FIG. 4 is a block diagram of an example computer system 400 in which various embodiments described herein may be implemented. Computer system 400 includes bus 405 or other communication mechanism for communicating information, at least one hardware processor 410 coupled with bus 405 for processing information. At least one hardware processor 410 may be, for example, at least one general purpose microprocessor.

Computer system 400 also includes main memory 415, such as random access memory (RAM), cache, other dynamic storage devices, or the like, or a combination thereof, coupled to bus 405 for storing information and one or more instructions to be executed by at least one processor 410. Main memory 415 also may be used for storing temporary variables or other intermediate information during execution of one or more instructions to be executed by at least one processor 410. Such one or more instructions, when stored on storage media accessible to at least one processor 410, render computer system 400 into a special-purpose machine that is customized to perform the operations specified in the one or more instructions.

Computer system 400 further includes read only memory (ROM) 420 or other static storage device coupled to bus 405 for storing static information and one or more instructions for at least one processor 410. At least one storage device 425, such as a magnetic disk, optical disk, or USB thumb drive (Flash drive), or the like, or a combination thereof, may be provided and coupled to bus 405 for storing information and one or more instructions.

Computer system 400 may further include display 430 coupled to bus 405 for displaying a graphical output to a user. The computer system 400 may further include input device 435, such as a keyboard, camera, microphone, or the like, or a combination thereof, coupled to bus 405 for providing an input from a user. Computer system 400 may further include cursor control 440, such as a mouse, pointer, stylus, or the like, or a combination thereof, coupled to bus 405 for providing an input from a user.

Computer system 400 may further includes at least one network interface 445, such as a network interface controller (NIC), network adapter, or the like, or a combination thereof, coupled to bus 405 for connecting computer system 400 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to at least one processor 410 executing one or more sequences of one or more instructions contained in main memory 415. Such one or more instructions may be read into main memory 415 from another storage medium, such as at least one storage device 425. Execution of the sequences of one or more instructions contained in main memory 415 causes at least one processor 410 to perform the process steps described herein. In alternative embodiments, hard-wired circuitry may be used in place of or in combination with software instructions.

As used herein, the term "Wi-Fi" is meant to encompass any type of wireless communications that conforms to the Institute of Electrical and Electronic Engineers (IEEE) 802.11 standard, whether 802.11ac, 802.11ax, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of WAP with any other brand of client hardware that also is certified. Typically, however, any Wi-Fi product using the same radio frequency (e.g., 5 GHz for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

As used herein, the term "Bluetooth" is meant to encompass any type of wireless communications that conforms to at least one of the Bluetooth® specifications. As used therein, the term "Bluetooth Low Energy" is meant to encompass any type of wireless communications that conforms to at least one of the Bluetooth® Low Energy specifications. The terms "Bluetooth" and "Bluetooth Low Energy" are currently promulgated by the Bluetooth SIG.

As used herein, the term "ZigBee" is meant to encompass any type of wireless communication that conforms to at least one of the specifications of the ZigBee® Specification. The term "ZigBee" is currently promulgated by the ZigBee Alliance. As used herein, the term "Z-Wave" is meant to encompass any type of wireless communication that conforms to at least one of the Z-Wave® protocols. The term "Z-Wave" is currently promulgated by Zensys Corporation.

As used herein, the terms "WAP" generally refers to at least one receiving point for any known or convenient wireless access technology which may later become known. A WAP generally functions as an electronic device that is adapted to allow wireless devices to connect to a wired network via various communications standards. For example, a WAP may allow wireless devices to connect to a wired network via at least one of the IEEE 802.11 standards. However, the term WAP is not intended to be limited to IEEE 802.11-based WAPs. A WAP may include any necessary hardware components (not shown) to perform the inventions disclosed herein, including, but not limited to: processors, memories, display devices, input devices, communications equipment, etc.

As used herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A system, comprising:
an authentication device, comprising:
   at least one processing resource; and
   at least one non-transitory machine-readable storage medium comprising instructions executable by at least one processing resource to:
      determine that a client device is authorized to connect to a network associated with the authentication device;
      receive a request from the client device to instruct a security device to perform an action, wherein the request comprises a key;
      authenticate the key received from the request; and
      based on the determination that the client device is authorized to connect to the network, and based on the authentication of the key, send a first signal to a network device, wherein the first signal instructs the network device to instruct the security device to perform the action.

2. The system of claim 1, the instructions comprising instructions-executable to:

based on the determination that the client device is authorized to connect to the network, prior to receiving the request, send the key to the client device.

3. The system of claim 1, further comprising:
the network device, wherein the network device comprises:
at least one processing resource; and
at least one non-transitory machine-readable storage medium comprising instructions executable by at least one processing resource to:
receive the first signal from the authentication device; and
based on the first signal, send a second signal to the security device, wherein the second signal instructs the security device to perform the action.

4. The system of claim 3, wherein the network device comprising instructions executable by at least one processing resource to:
based on the determination, by the authentication device, that the client device is authorized to connect to the network:
receive the key from the authorization device; and
prior to receiving the request, send the key to the client device.

5. The system of claim 3, wherein the second signal comprises a ZigBee-based signal.

6. The system of claim 1, wherein the first signal comprises a Wi-Fi-based signal.

7. The system of claim 1, wherein the security device comprises a ZigBee-enabled security lock.

8. The system of claim 1, the instructions to authenticate the key comprising instructions executable by the at least processing resource to:
determine that the key is the same as a key in at least one entry in a repository.

9. The system of claim 1, wherein the key comprises at least one identification that is based on a location of the client device, an access code received by the client device, a facial recognition associated with a user, a location associated with a user, a date associated with a user, a time associated with a user, or a combination thereof.

10. The system of claim 1, wherein the key comprises at least one value that changes after a predetermined time period.

11. The system of claim 1, the instructions executable by the processor further to:
upon instructing the security device to perform the action, receiving, at the authentication device, one or more instructions to deactivate the key.

12. A method, comprising:
determining that a client device is authorized to connect to a network;
receiving a request from the client device to instruct a security device to perform an action, wherein the request comprises a key;
authenticating the key received from the request;

based on the determination that the client device is authorized to connect to the network, and based on the authentication of the key, sending, by a network device, a signal to instruct the security device to perform the action.

13. The method of claim 12, further comprising:
based on the determination that the client device is authorized to connect to the network, sending the key to the client device before receiving the request.

14. The method of claim 12, wherein the signal comprises a ZigBee-based signal.

15. The method of claim 12, further comprising:
based on the determination that the client device is authorized to connect to the network:
receiving, at the network device, the key; and
sending, by the network device, the key to the client device before receiving the request.

16. The method of claim 12, wherein the security device comprises a ZigBee-enabled security lock.

17. The method of claim 12, wherein authenticating the key comprises determining that the key is associated with an entry in a repository.

18. The method of claim 12, wherein the key comprises at least one identification that is based on a location of the client device, an access code received by the client device, a facial recognition associated with a user, a location associated with a user, a date associated with a user, a time associated with a user, or a combination thereof.

19. The method of claim 12, wherein the key comprises at least one value that changes after a predetermined time period.

20. An article comprising at least one non-transitory machine-readable storage medium comprising instructions executable by at least one processing resource to:
determine that a client device is authorized to connect to a network;
receive, from the client device, a request to instruct a security device to perform an action, wherein the request comprises the key;
authenticate the key received from the request;
based on the determination that the client device is authorized to connect to the network, and based on the authentication of the key:
receive, at a network device, a first signal to instruct the network device to instruct the security device to perform the action, and
send, by the network device, a second signal to instruct the security device to perform the action.

21. The article of claim 20, wherein the first signal comprises a Wi-Fi-based signal, and the second signal comprises a ZigBee-based signal.

* * * * *